(12) United States Patent
Suzuki

(10) Patent No.: US 6,368,211 B1
(45) Date of Patent: Apr. 9, 2002

(54) GAME SYSTEM AND COMPUTER-READABLE STORAGE MEDIUM

(75) Inventor: Gen Suzuki, Nagoya (JP)

(73) Assignee: Konami Corporation, Tokyo (JP)

(*) Notice: Subject to any disclaimer, the term of this patent is extended or adjusted under 35 U.S.C. 154(b) by 0 days.

(21) Appl. No.: 09/716,781

(22) Filed: Nov. 20, 2000

(30) Foreign Application Priority Data

Nov. 25, 1999 (JP) ............................................. 11-334068

(51) Int. Cl.[7] ................................................ A63F 9/30
(52) U.S. Cl. .......................... 463/7; 463/43; 273/138.1; 273/138.2; 273/139; 273/140; 273/461
(58) Field of Search ....................... 463/7, 43; 273/140, 273/139, 138.1, 138.2

(56) References Cited

U.S. PATENT DOCUMENTS 5,713,792 A * 2/1998 Ohzono et al. ................. 463/7
5,730,655 A * 3/1998 Meredith ...................... 463/37

FOREIGN PATENT DOCUMENTS

JP     411226261   * 2/1998
JP     0200093650   * 4/2000

OTHER PUBLICATIONS

Sega Marine Fishing by Sega—Review.*
Deep Sea Trophy Fishing by John Campbell, Sep. 20, 1998.*
Pro Bass Fishing by Wizards Games of Scotland. Review.*
Sega Bass Fishing—Review by James Mielke, Oct. 12, 1999.*
PVC—More gaming news than you can spank with a 6–foot paddle. Review.*

* cited by examiner

Primary Examiner—Jessica J. Harrison
Assistant Examiner—Yveste Cherubin
(74) Attorney, Agent, or Firm—Jordan and Hamburg LLP

(57) ABSTRACT

An object of the present invention is to provide a game system to present a larger amount of information for fish arrangement to a player. In the game system with a control device to progress a fishing game in a virtual fishing spot, referring to outputs of an input device, and to display images on a screen of a display device according to a progressing states of the above fishing game, the above device decides a fish arrangement in the above virtual fishing spot; detects fish distribution in a detection range defined on a line connecting two positions in the above fishing spot; displays a gauge extending in a direction of one axis on a screen of the above display device; and displays information according to a detected result of the above fish distribution at each position on the above detection range, replacing a distance from one end of the above detection range to each position within the above detection range with a distance from one end of the above gauge to each position in the pertinent gauge.

13 Claims, 15 Drawing Sheets

GAME SYSTEM AND COMPUTER-READABLE STORAGE MEDIUM

BACKGROUND OF THE INVENTION

1. Field of the Invention

The present invention relates to a game system using a computer and a storage medium.

2. Description of the Prior Art

There has been a fishing game for virtual experiences of fishing, in which a fishing spot is displayed on a screen of a display device as this kind of game, and positions and behaviors and so on of a contrivance and a fishing rod in the screen are changed, according to a player's operation for an input device. Especially, there have been developed many games for lure fishing having various kinds of strategic characteristics in selection of fishing points, lures, approaches, and their combinations. For reference of players, there have been games displaying a mark giving a sign of fish, that is, a presence of fish, to a place where there are fish in groups.

However, there have been limits in amount of information to be displayed by showing such signs of fish, and then, such signs have not been enough as a clue for players to get information on a fish arrangement. Though, for example, there is fish behavior that small fish forms a group, and big one solitary behavior, a conventional method for displaying signs of fish may not express the such difference in grouping patterns.

SUMMARY OF THE INVENTION

The present invention has an object to provide a game system to display larger amounts of information on fish arrangements to players than those of conventional one, and a computer-readable medium suitable for the above game system.

A game system of the present invention comprises: an image display device; an input device to output signals according to a player's operation; a control device to proceed with a fishing game in a virtual fishing spot, and to display images on a screen of the display device according to a progressing states of the fishing game, referring to outputs of the above input device. The control device comprises: arrangement decision device to decide a fish arrangement in the above virtual fishing spot; detection device to detect a fish distribution in a detection range defined on a line connecting two positions in the fishing spot; and distribution display device to display a gauge extending in a direction of one axis on the screen of the display device, and to display information according to a detected result of the distribution at each position of the detection range, at each position on the gauge, replacing a distance from one end of the detection range to each position within the detection range with a distance from one end of the gauge to each position in said gauge. Thereby, the above mentioned problems may be solved.

According to the present invention, a player may easily understand the fish arrangement with its position since the fish distribution is detected on the gauge, with each position within the detection range, and each position on the gauge in correspondence with each other. Therefore, larger amount of information on the fish arrangement may be given to the player in comparison with a conventional games in which only fish groups are displayed. Numerals, figures, signs and so on corresponding to numbers and sizes of the detected fish, may be used as information displayed at each position on the gauge. At least one of a color, a pattern, a contrast, or a tone may be changed according to the fish distribution at each position. Thereby, as the fish distribution may be displayed in the gauge extending in a direction of one axis, the fish distribution may be easily displayed even on a game system with limited displaying ability such as a hand-held game device.

The game system of the present invention may be provided with detection range display device to display information (31, 34) to specify the detection range, on images according to the fishing spot displayed in the display device. In this case, a player may easily understand which part in the fishing spot is displayed on the gauge as a fish distribution.

Moreover, a game system may comprise position change device to change at least one of two positions defining the detection range, according to a predetermined position change operation for the input device; the detection device may perform re-detection of the fish distribution after redefinition of the detection range in cooperation with the position change by the position change device; and the distribution display device may update the display on the gauge corresponding to the re-detection of the distribution. In this case, a fish distribution within a new detection range distribution is displayed on the gauge according to the position change a player's operation. Thereby, the player may confirm the fish distribution within various kinds of ranges in the fishing spot.

The game system of the present invention may comprises width change device to change the width of the detection range. Thus, a fish distribution within a suitable range may be displayed to a player according to the condition.

The above distribution display device may display information according to a detected result of the distribution by changing display appearance (for example, a color, contrast, tone, and pattern) at each position on the gauge, depending on the presence or absence of fish at each position within the detection range. Thereby, it may be possible to read on the gauge that smaller fishes are in groups and big fishes perform solitary behavior, as places with fish and those without fish are clearly divided on the gauge.

In a preferable embodiment of the present invention, the detection range is set on at least a part of the range on the line connecting a start and a planned casting position of a contrivance in the fishing spot. Here, the planned casting position means a position at which a contrivance is predetermined to arrive, viewed from a state before casting of the contrivance. When the detection range is defined between such positions, more useful information may be given to the player, as fish distribution in at least a part of the range on a retrieval path of the contrivance is displayed on the gauge.

In the above embodiment, there may be provided position display device to display images to respectively specify the start and planned casting position on images according to the fishing spot displayed on the display device. Thereby, the player may easily and properly understand a fish distribution on the retrieval path of the contrivance, having information on the gauge and information on the casting start position and on the planned casting one as a hint.

Further, there may be provided position change device to change at least one of the start and the planned casting position according to a predetermined position change operation for the input device; the detection device may perform re-detection of the fish distribution after redefinition of the detection range depending on the position change by the position change device; and the distribution display device may update the display on the gauge corresponding to the re-detection of the distribution.

In this case, the player may select the best start or the planned casting position by changing various kinds of the start and planned positions of casting with checking the fish distribution on the gage.

In addition, there may be provided detection range change device to change the width within the detection range according to the kind of the contrivance. Thereby, a fish distribution within a range suitable for each contrivance may be displayed to the player by changing the detection range according to the difference, when a plurality of angles have different ability for luring fish from each other.

The game system may comprise a contrivance position display device on the gauge or in the vicinity thereof in order to display images denoting the current position of the contrivance.

Then, the player may decide whether or not the contrivance is passing through a part with the presence of fish in the process of retrieving the contrivance, using the display of the gauge as a hint. Therefore, the concern of the player for retrieving operation of the contrivance may be raised by changing the expecting degree of the player in the process of retrieving the contrivance.

The game system may comprise casting execution device to cast the contrivance at any position on the line connecting the start and the planned casting position, corresponding to a predetermined casting operation for the input device.

Thus, it may be possible to closely relate the display on the gauge to the operation to retrieve the contrivance, as the contrivance always passes through the detection range during the retrieval process.

In the game system of the present invention, the arrangement decision device may be desired to decide the fish arrangement, considering fish behavior that the smaller fish has the more remarkable tendency to form a group, and the bigger one has the more remarkable tendency to have solitary behavior.

The storage medium of the present invention is a computer readable storage medium having recorded therein a program to progress a fishing game in a virtual fishing spot, referring to outputs of an input device of a game device, and to display images on a screen of a display device of the game device according to a progressing states of the fishing game, and it is wherein the program makes a computer installed in the game device function as arrangement decision device to decide a fish arrangement in the virtual fishing spot; detection device to detect fish distribution in a detection range defined on a line connecting two positions in the fishing spot; and gauge display control device to display a gauge extending in a direction of one axis on a screen of the display device, and to display information according to a detected result of the distribution at each position on the detection range, at each on the gauge, replacing a distance from one end of the detection range to each position within the detection range with a distance from one end of the gauge to each position in said gauge.

According to the storage medium of the present invention, the computer may function as a control device in the game system of the present invention by making the computer read the program for execution.

The term "contrivance" in the present invention includes lure, fly, pseudo food and other kinds of elements to be operated for catching fish in actual fishing. The storage medium includes a magnetic storage medium, an optical storage medium, a magneto-optical storage medium, a semiconductor storage element, and other kinds of storage device.

DETAILED DESCRIPTION OF THE INVENTION

Figure 1:
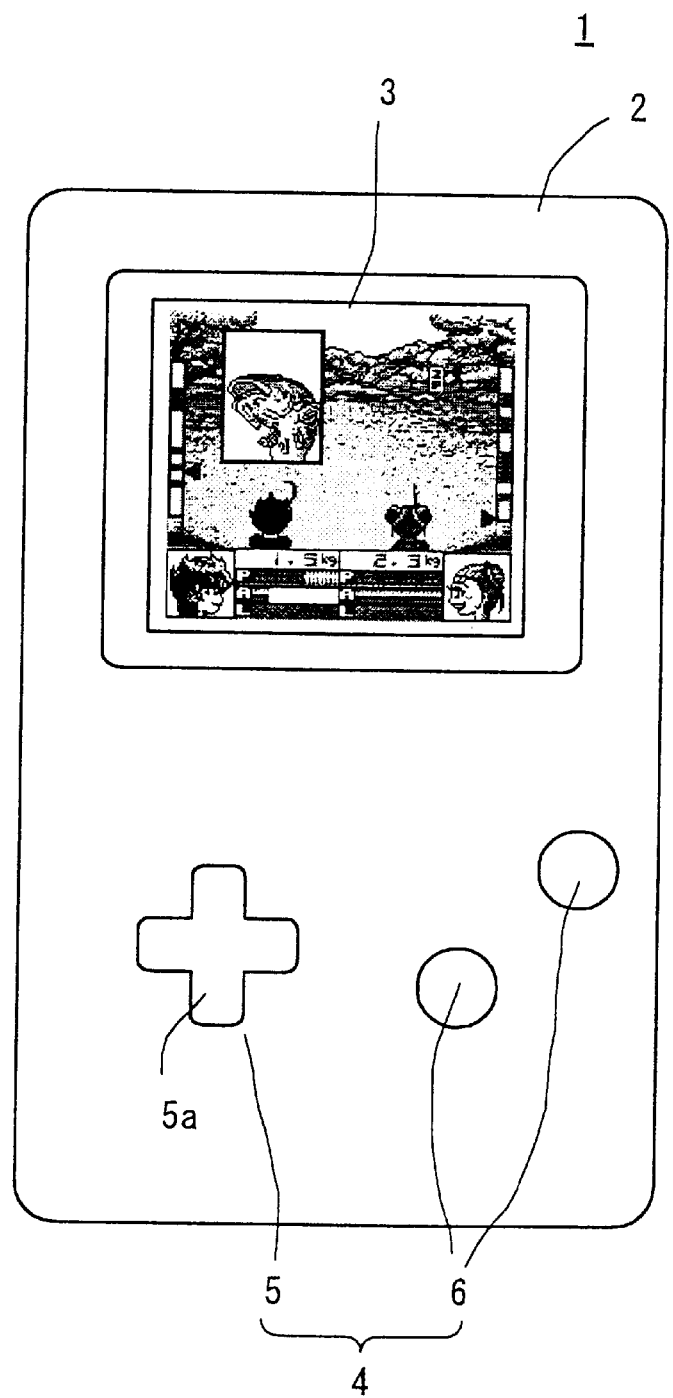
FIG. 1 is a diagram showing an embodiment of a hand-held game device of the present invention.

FIG. 1 shows an embodiment of a configuration of a hand-held game device according to the present invention. A hand-held game device 1 comprises a main body 2, a liquid crystal monitor 3 installed in the main body 2 as a display device, and an input device 4. The input device 4 comprises a direction indicating switch 5, and a plurality of push button switches 6. The direction indicating switch 5 comprises an operation member 5a with, for example, a cross shape, and outputs signals according to operation for vertical, or crosswise direction motion (pushing operation of an end at the top, bottom, right, or left part) of the operation member 5a. Such configuration of the input device 4 is well known, and various kinds of variations may be possible. For example, instead of the operation member 5a, one push button switch may be arranged at the top, bottom, right, and left parts, respectively.

Figure 2:
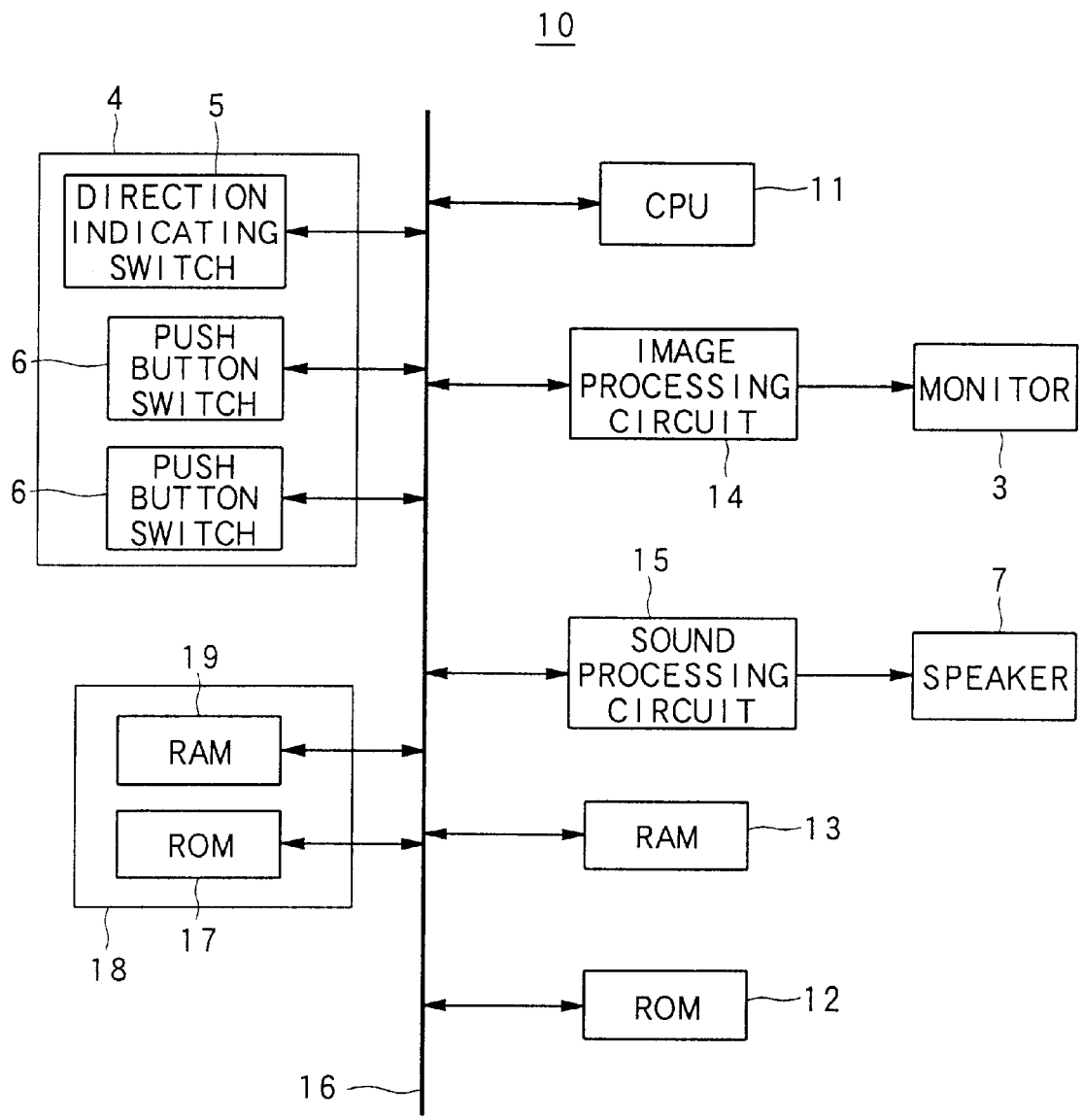
FIG. 2 is a diagram showing a schematic configuration of a control device installed in the hand-held game device of FIG. 1.

FIG. 2 shows a configuration of a control device 10 installed in the game device 1. The control device 10 is configured as a computer mainly composed of a CPU 11 using a microprocessor. The CPU 11 is connected to a ROM 12 and a RAM 13 as a main storage device, an image processing circuit 14, and a sound processing circuit 15 through a bus 16, respectively. Programs necessary for basic control (for example, start processing) of the game device 1 are stored in the ROM 12. The work area for the CPU 11 is secured in the RAM 13. The image processing circuit 14 controls a liquid crystal monitor 3 according to a drawing command from the CPU 11, and displays a predetermined image on a screen of the monitor. The sound processing circuit 15 generates an analog audio signal according to a production command from the CPU 11, and outputs it to a speaker 7.

The CPU 11 is connected to the switches 5 and 6 of the input device 4 through the bus 16, and then able to judge the operation state of the switches 5 and 6. And an external storage device 17 configured separately from the control device 10 is connected to the bus 16. The external storage device 17 is configured to be, for example, of a cassette type attachable to/detachable from the main body 2, and, for example, a ROM 18, and a RAM 19 are provided in the memory 17 as a storage medium. Programs making the control device 10 function as various kinds of devices of the present invention, and various kinds of data necessary for execution of the programs are previously stored in the ROM 18. For example, save data of a game are stored in the RAM 19 as required. The data in the RAM 19 are retained, for example, by auxiliary cells installed in the external storage device 17. In stead of the RAM 19, a rewritable ROM such as an EEPROM (electrically erasable and programmable read only memory) may be used. Not only a semiconductor storage element, but also various kinds of storage: media such as a magnetic storage medium, an optical storage medium, and a magneto-optical storage medium may be used as the storage medium of the external storage medium 17. And though interface circuits may be respectively inserted between the bus 16 and each element as required, they are not shown in the drawing. The configuration of the control device 10 is not limited to the above, and various kinds of control devices may be used.

Figure 3:
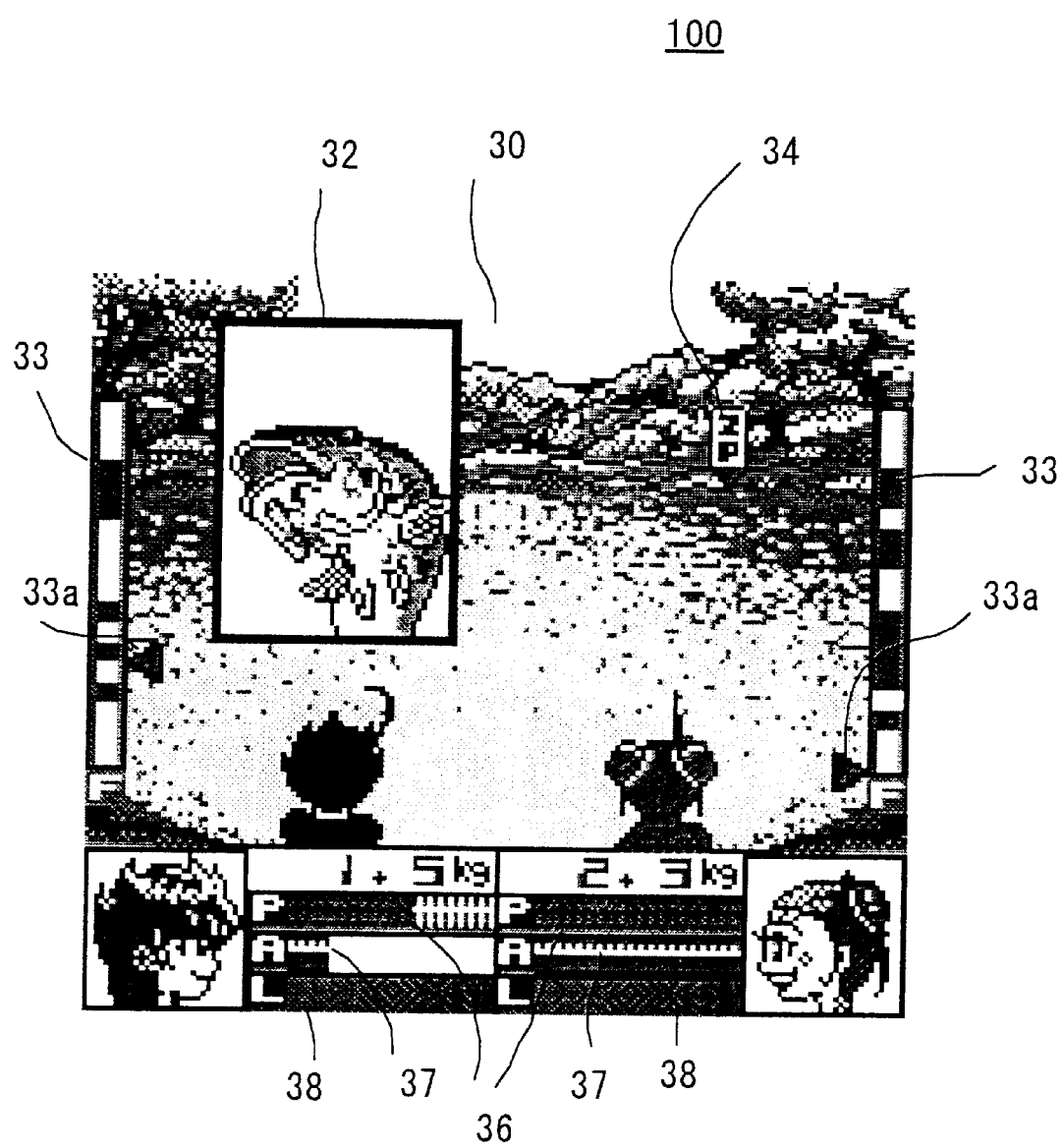
FIG. 3 is a view showing one example during playing a game, displayed on a screen of the hand-held game device of FIG. 1.

FIG. 3 shows one screen of a fishing game executed by the programs stored in the external storage device 17. A screen 100 of FIG. 3 is displayed at playing a fishing game, and it is displayed on the main screen 30 that two game characters 31, 31 are fishing in a line. The player holding the game device 1 may perform casting and retrieving of a lure by operation of one of two characters through the input device 4, and then may compete with the other character for fishing results. The other character is controlled, for example, by the CPU 11. When a communication device is installed in the controller 10, other characters may be operated by a player operating another game device 1.

A sub-screen such as an animation window 32 is repeatedly displayed on the main screen 30, as required. The sub-screen is used to display an operation guide and various kinds of information, and so on for lures. The sub-screen is deleted, when it is not required. The animation window 32 in FIG. 3 is configured to display an image showing how fish is caught with the lure. Gauges of a shoal of fish 33, 33 are displayed on the main screen 30 at the right and left sides. The gauge of a shoal of fish 33 is of a vertically-slender, and rectangular shape, and the fish distribution between each character 31 and a pointer 34 is displayed on the gauge. The details will be described later. The pointer 34 is displayed as a mark in a direction of casting when each character 31 casts a lure. In order to make a clear distinction between the characters 31, 31, letters of "1P" is displayed on the pointer 34 for the character 31 at the left side of FIG. 3, and letters of "2P" is displayed on the pointer 34 for the character 31 at the right side of FIG. 3. Only the pointer 34 for the right character 31 is shown in FIG. 3.

A fishing result meter 35, a power meter 36, an appeal meter 37, and a line tension meter 38 are displayed on the bottom part of the main screen 30. The fishing result meter 35 displays the mass of caught fish by each character 31 in numerals. The power meter 36 displays the force (power) of each character 31 at casting. The left end of the meter 36 denotes the minimum power, and the right one shows the maximum power.

The casting position of the lure by the character is determined by relation between the power displayed on the power meter 36 and the position of the pointer 34. That is, the power meter 36 repeatedly performs expansion and contraction at a fixed cycle at casting of the lure. The pointer 34 is moved in a crosswise direction on the main screen 30 according to a selective operation in a predetermined casting direction (preferably, a crosswise operation of the direction indicating switch 5) for the input device 4. The casting distance of the lure is calculated in proportion to the power shown in the meter 36 at the time when the player performs a predetermined casting operation (for example, a pushing operation of the push button switch 6). The lure is cast to a position on the line connecting the character 31 and the pointer 34, according to the calculated casting distance.

The appeal meter 37 is used to display an appeal degree of the lure to a fish. The left end of the meter 37 shows the minimum appeal degree, and the right one denotes the maximum appeal degree. The fish may not be caught when the appeal degree is not the maximum. The appeal degree is raised if the player actively operates the lure, according to a command for a lure action displayed on a lure window 50A shown in FIG. 6, or a lure window 50B shown in FIG. 8. The details of the lure windows 50A and 50B will be described later.

Then, the gauge of a shoal of fish 33 will be described, referring to FIG. 4. The display contents of the gauge 33 is controlled based on the fish arrangement within the detection range 41 with a predetermined width W defined between a position Pa (casting start position) of the character 31, and a position Pb (planned casting position) of the pointer 34. The width W is set as a range denoting that the lure may lure fish. In the present embodiment, though the player may select a lure for fishing from a plurality of lures, the width W may be set at a fixed value independent from the kinds of the lures, or the width may be changed according to the lures. In addition, the detection range 41 is longitudinally divided into a plurality of sections 42 . . . 42.

Figure 4:
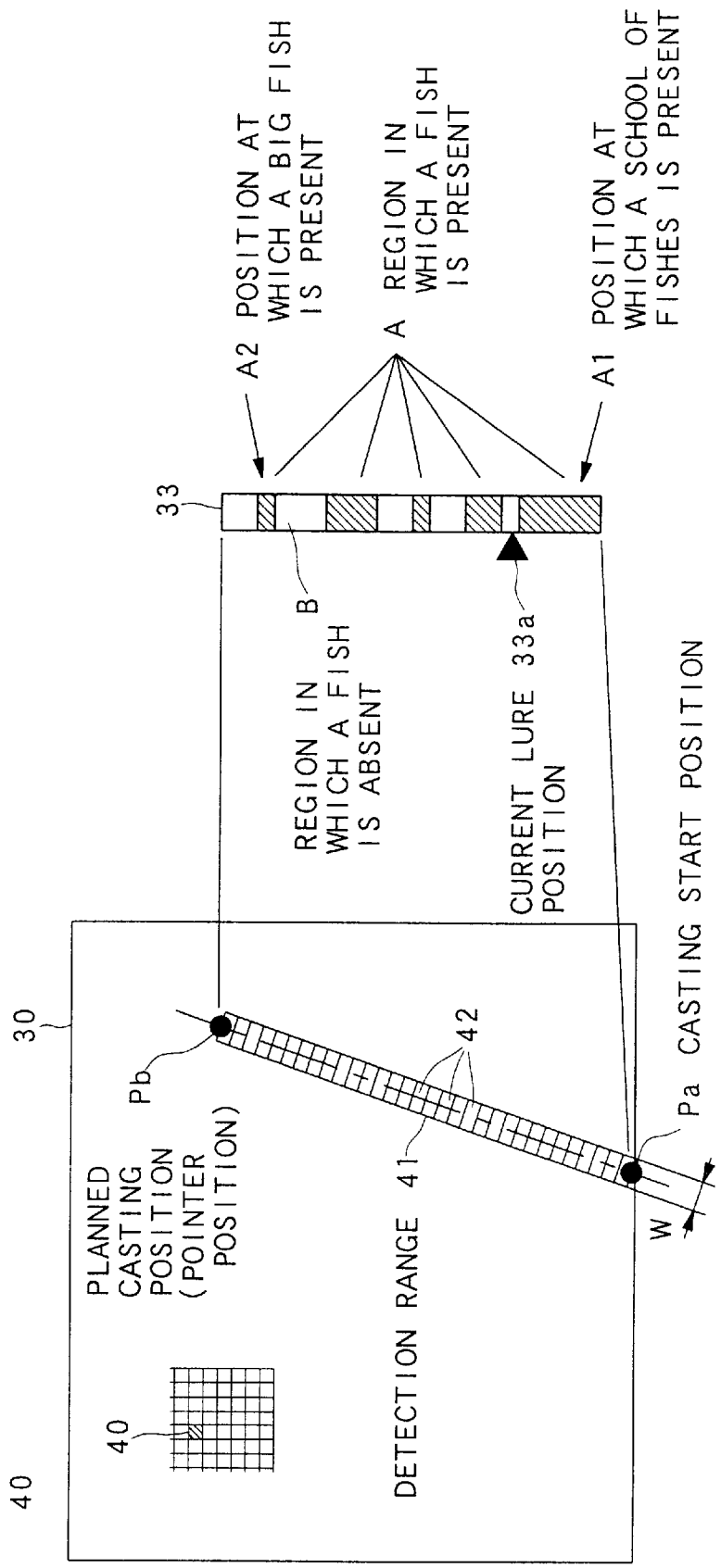
FIG. 4 is a diagram illustrating a content of a gauge of a shoal of fish displayed at both sides of the screen of FIG. 3.

On the other hand, the underwater part of the main screen 30 is divided into a lot of areas 40 . . . 40 (one area is shown by hatching in FIG. 4). And the fish arrangement is decided for each area 40 by the CPU 11 at the start of fishing. The fish arrangement of the fish may be calculated by every area 40 as required, using a predetermined operational formula, or a plurality of data on fish arrangements may be previously made to be stored in the ROM 18 to select one item of data from those items of data as required. The above techniques have been adopted even by conventional fishing games, and then the details are eliminated. And the fish arrangement may be decided in consideration of the habits of actual fish. For example, the fish arrangement may be decided for each area 40, considering fish habits that a big fish performs comparatively solitary behavior and a small fish forms a group.

When the gauge of a shoal of fish 33 is required to be displayed, the fish arrangement (presence of fish) for each section 42 may be detected by the CPU 11, based on the relation between each section 42 and area 40. And as for relation between a section 42 and an area 40, an area 40 which overlaps with a section 42 at a fixed rate (for example, 50%) may be dealt as a corresponding area 40 with the section 42, for example.

The character position Pa is located at the bottom of the gauge of a shoal of fish 33, the planned casting position Pb at the top of the gauge 33, and each section 42 in the detection range 41 is associated with each position in the gauge of a shoal of fish 33. Thereby, the gauge of a shoal of fish 33, having distinction between a section in one color with the presence of fish and one in the other color with no presence of fish, may be generated. That is, the detection result of a fish distribution in each section 42 within the detection range 41 is displayed at each position on the gauge 33, replacing the distance from one end of the detection range 41 with the distance from the bottom of gauge 33. In FIG. 4, hatched colored parts A (A1 and A2 are included) shows a part where fish is detected, and white parts B denotes a part where fish is not detected.

Thereby, the gauge of a shoal of fish 33 generated as shown above denotes fish distribution between the character position Pa and the planned casting position Pb. As mentioned above, when the fish arrangement is decided considering the difference in fish grouping habits between big fish and small fish, the longer colored part A1 shows that a lot of small fishes are forming a group, and the shorter colored part A2 denotes that there are small number of big fish. A triangular cursor 33a shows a current position in the gauge 33.

Figure 5:
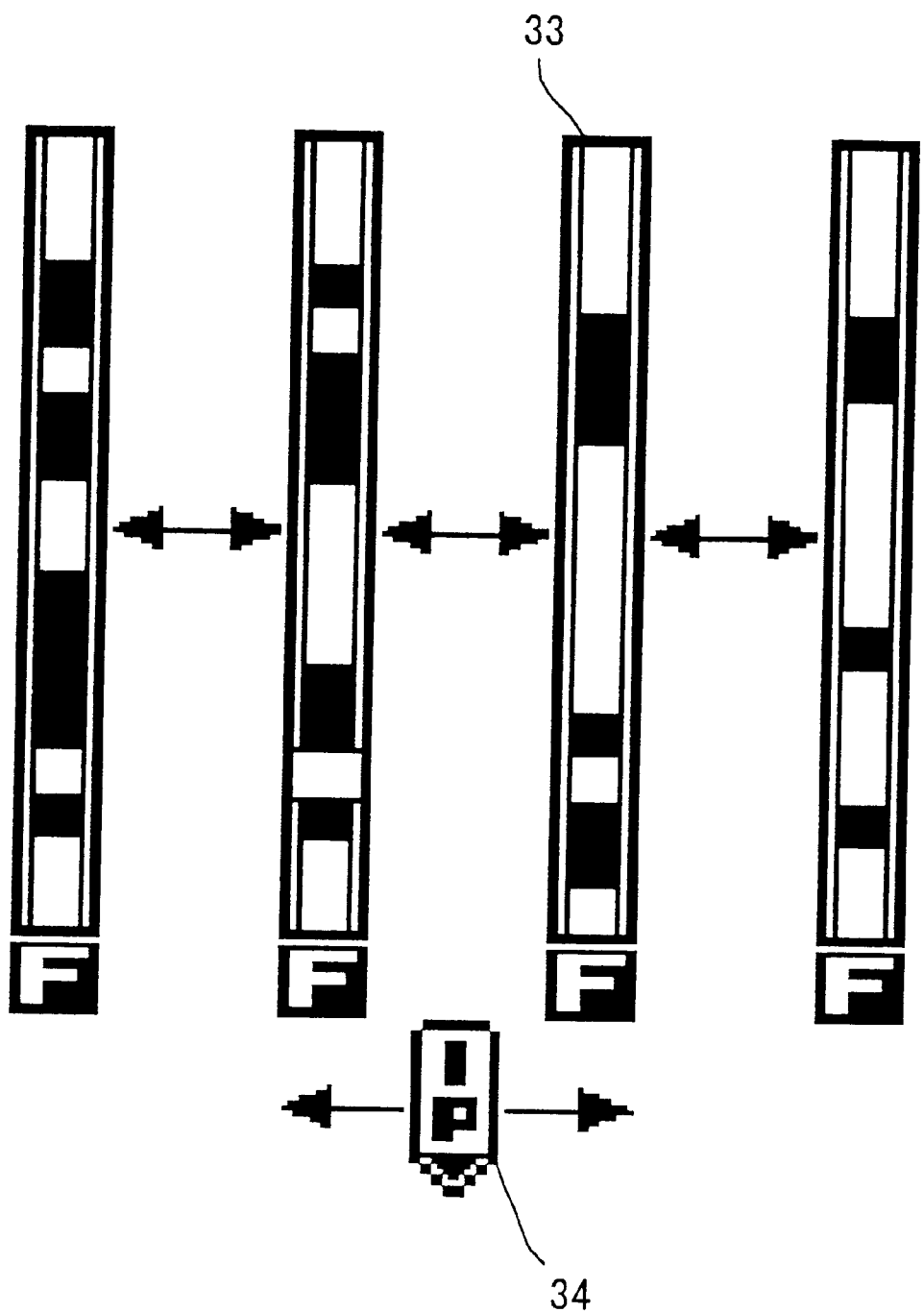
FIG. 5 is a view showing how the display content of the gauge of a shoal of fish of FIG. 4 is changed according to movements of a pointer.

The planned casting position Pb in FIG. 4 is moved according to the crosswise movement of the pointer 34 in FIG. 3 on the main screen 30 in response to the operation of the player. Therefore, the gauge of a shoal of fish 33 is changed as shown in FIG. 5 according to the movement of the pointer 34, even if the fish arrangement in the main screen 30 is not changed. Though the gauge 33 is shown above the pointer 34 to show a relation between a crosswise movement of the pointer 34 and the change of the gauge 33 in FIG. 5, the display position of the gauge 33 is fixed to right and left end parts of the main screen 30 as shown in FIG. 3. The ratio of colored part A is the maximum in the gauge 33 at the left end part in FIG. 5, and the probability which a fish is caught is the maximum, if casting is performed at this time. Moreover the probability which a small fish is caught is the maximum. On the other hand, if casting is performed when there is displayed the gauge of a shoal of fish 33 at the right end part, the probability which a fish is caught is low, but a big fish may be caught.

In conventional fishing games, not enough information showing only that a sign of fish is displayed at a place with presence of a group of fish has been offered to the player. On the other hand, an wide range of the fish distribution may be obtained by changing the planned casting position Pb, as the fish distribution to the planned casting position Pb is shown in detail according to the gauge of a shoal of fish 33 mentioned above. Then the player may choose a method for fishing according to his or her taste. The game may be provided with an option to select a fishing method according to a playing rule of the game. When the fishing method is required to be changed according to the set rule, for example, a rule in which a character who has caught larger number of fishes within a fixed time is a winner, or a rule where one who has caught the biggest fish is a winner, a suitable casting position for the rule may be easily selected, referring to the gauge of a shoal of fish 33.

And the position Pa of the character 31 may be configured to be changed by an operation for the input device 4 (for example, a crosswise operation of the direction indicating switch 5). The gauge of a shoal of fish 33 is not limited to the one vertically extending, and may be the one extending in a crosswise direction. For example, if the lure is cast or retrieved in a crosswise direction on the screen, it may be conceivable that a gauge 33 with a long dimension in a crosswise direction is displayed at the top or bottom of the screen 30. The detection range 41 is not limited to total length on the line connecting the casting start position Pa and the planned casting position Pb, and may be a part of a range on the line. In addition, two arbitrary points may be set in the fishing spot according to an operation of the player, and the detection range 41 may be set on the line between those points.

In the fishing game of the present embodiment, various types of lures may be provided in a similar manner to the actual lure fishing. Peculiar information is set in each lure, and the information is previously recorded in the ROM 18 of the external storage device 17 as necessary data for the game. The information peculiar to each lure comprises, for example, a name and type of the lure, and image data of a lure to be used. When the width W within the detection range 41 in FIG. 4 is changed according to the lure as mentioned above, information to set the width W may be preciously included in the information peculiar to the lure.

The lure used for actual fishing may be divided in a various manner. For example, from a view point of applied water depth, the lure may be divided to a top one for water surface use, a bottom one for water bottom use, a shallow one for shallow water depth use, and a middle one for middle water depth use. From a view point of a relation between the retrieving operation and the lure action, the lure may be divided to a type which sinks by pulling and floats by loosing, another type which floats by pulling, and sinks by loosing, or a further another type holding a fixed water depth independent of the presence or absence of retrieving. The information peculiar to each lure, which is recorded in the ROM 18, includes information for identification of the type of each lure. Though the detailed division into more lure types increases the virtual reality of the fishing game, the more lure types increases the more data for the lures to require the game device 1 with the higher processing performance, too. Thereby, it is preferable to set the quantity of information for each lure within the reasonable range, considering the processing performance of the game device 1.

Figures 6A, 6B, 6C:
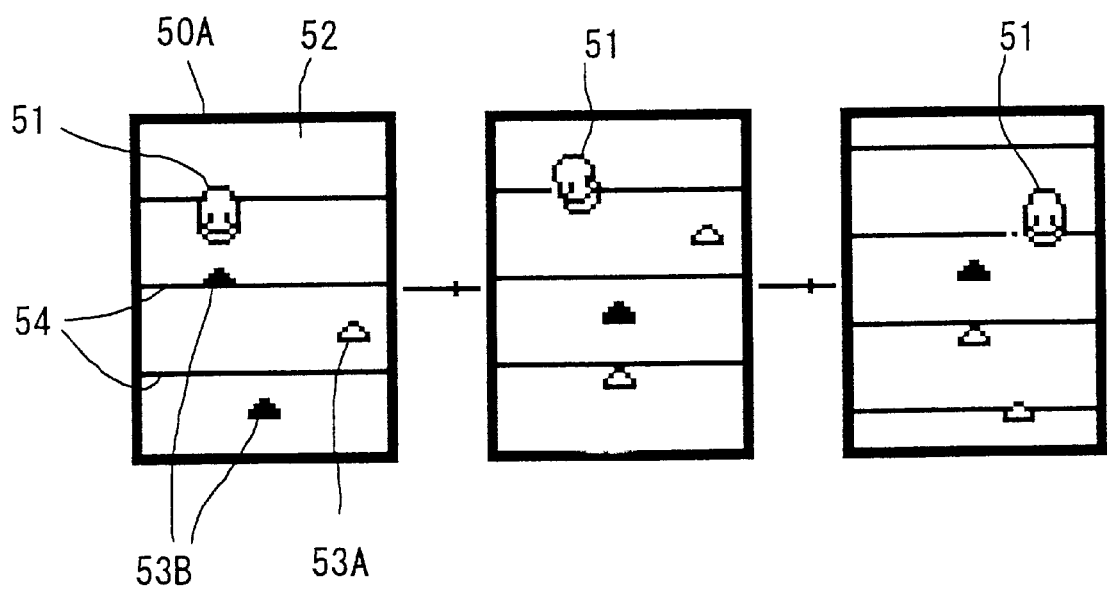
FIGS. 6(a) to 6(c) are views showing one example of a lure windows displayed on the main screen of FIG. 3 in an overlapping manner.
Figure 7:
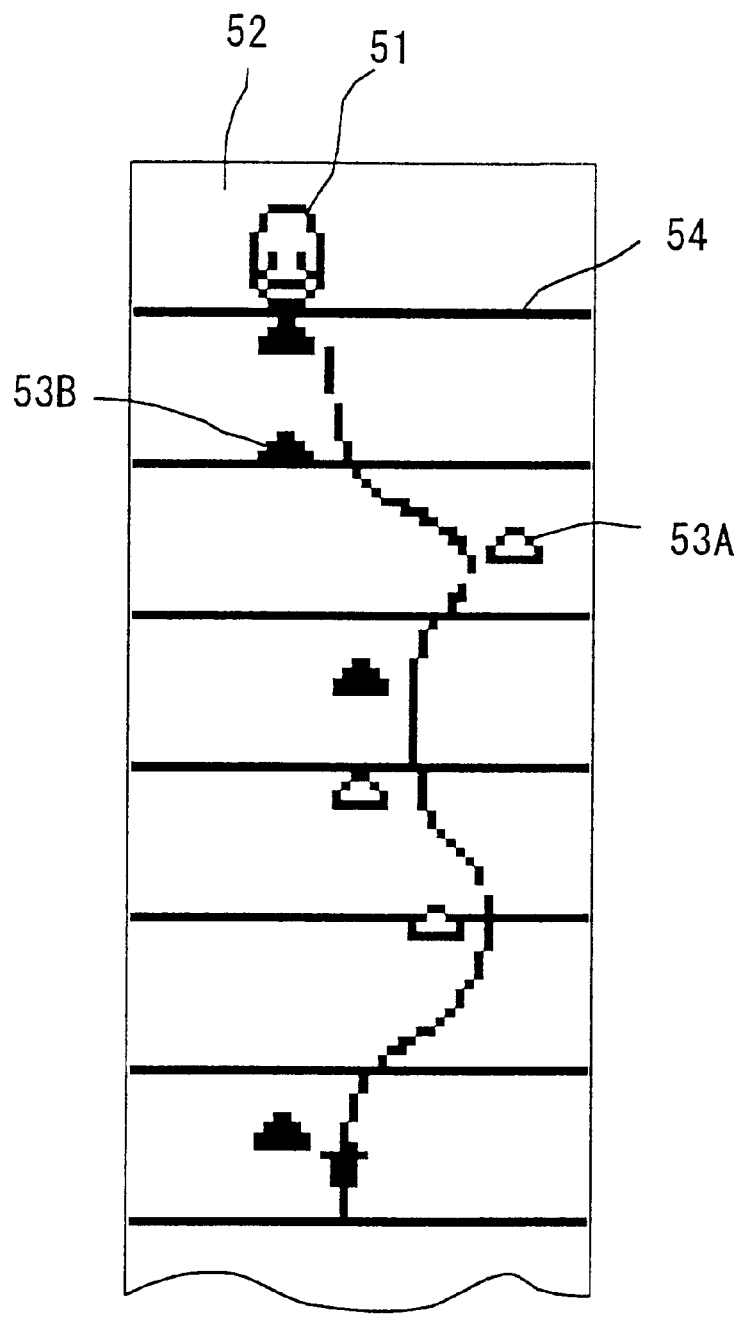
FIG. 7 is a view showing how a lure is operated according to a command given through the lure windows of FIG. 6.
Figures 8A, 8B, 8C:
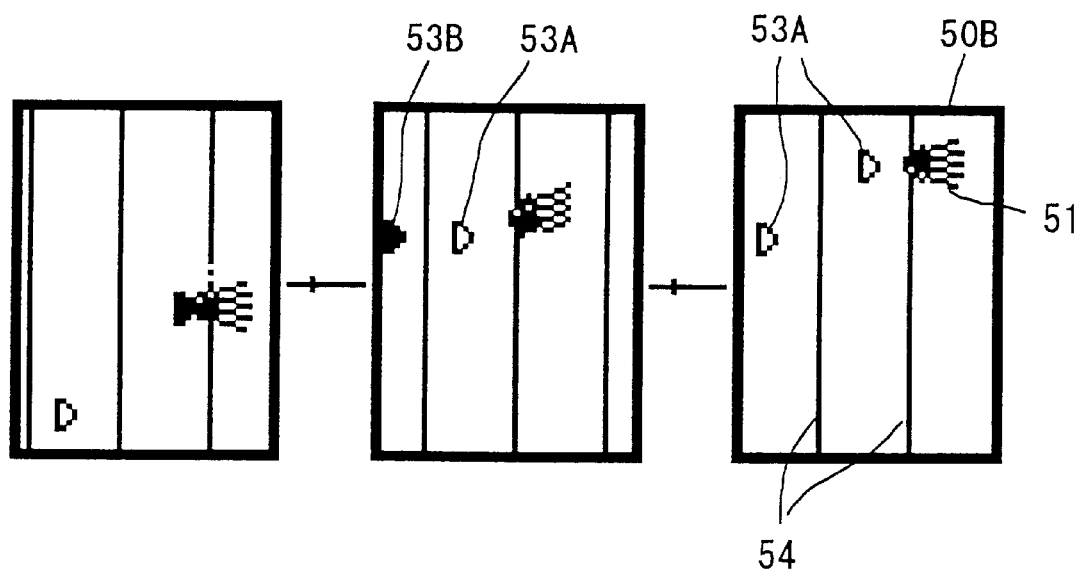
FIGS. 8(a) to 8(c) are views showing another example of the lure window displayed on the main screen of FIG. 3 in an overlapping manner.

Then, a guiding method for the lure operation for a player will be described below, referring to FIGS. 6 to 9. When the player casts a lure by operation of a character 31 to be operated, a first type of a lure window 50A shown in FIG. 6, or a second type of a lure window 50B shown in FIG. 8 is displayed as a sub screen on the main screen 30 (See FIG. 3), according to the character 31 to be operated. In FIGS. 6 and 8, there are arranged three windows at different times, respectively, in order to show the changes in the lure windows 50A and 50B with time. In those drawings, time progresses in the order, (a)→(b)→(c).

The first type of the lure window 50A shows, looking down from the above, how a lure 51 shown as an abstracted form for the first image is moving on the water surface or in the water, and the lure 51 is going toward the lower part of the window 50A (in a retrieving direction). On the other hand, the second type of the lure window 50B shows, along with the vertical section, how the lure 51 shown as an abstracted form is moving in the water, and the lure 51 is going toward the left part of the window 50B (in a retrieving direction). The selection of the lure window 50A or 50B depends on the lure type. Therefore, the information peculiar to the lure stored in the external storage device 17 is required to include information specifying the lure window 50A or 50B. For example, information specifying the lure type may be used. The data with a table having a relation between the lures and the lure window 50 to be used for the lure may be stored in the ROM 18.

The lure window 50A is convenient to display a crosswise movement of the lure 51, and the lure window 50B is preferable to show a vertical movement of the lure 51. Therefore, it is preferable to use the lure window 50A for the lure type without change in the water depth, and the window 50B for the type with change in the depth. And when there is no need to make difference between both the windows 50A and 50B, the expression of the lure window 50 may be used for the both, hereinafter.

The lure window 50 is displayed at the upper side of the character 30, and for example, when the character 31 at the left side of FIG. 3 is operated, the lure window 50 is displayed in place of the animation window 32. As shown in FIGS. 6 and 8, a background 52 is displayed in the lure windows 50A and 50B with the lure 51. And in the background 52, a plurality of partition lines 54 . . . 54 at equal distances extending in a crosswise direction of the lure window 50A are displayed with marks 53A and 53B of a triangular shape, as a second image which functions as a guide showing a passing position of the lure 51.

When the lure window 50A of FIG. 6 is displayed, the lure 51 is moved in a crosswise direction in the lure window 50A according to a predetermined course change operation for the input device 4. The course change operation is performed, imaging that the lure is moved in a zigzag direction by shaking a fishing rod in a crosswise direction, in actual fishing. Therefore, it is preferable to allocate the crosswise operation of the direction indicating switch 5 as the course change operation. The background 52 is moved in a scrolling display mode at a predetermined speed from the bottom to the top of the window 50A with marks 53A and 53B, and the partition lines 54. That is, in the case of the lure window 50A, the background 52 is configured as an image of a vertically-long strip shape as shown in FIG. 7, and a part of the background 52 is displayed in the lure window 50A. The display range is gradually moved downward, and the background 52 in the window 50A is scrolled. The background 52 is scrolled to show how the lure 51 is retrieved toward the character 31, moving in a zigzag direction according to the course change operation with the input device 4.

The marks 53A and 53B show a passing position of the lure 51 during an appropriate action of the lure 51. And the marks 53A and 53B are distinguished each other by color. If the player can make the lure 51 pass on the mark 53A by the crosswise operation, the appeal degree (a value of the appeal meter 37) is raised. And, the appeal degree is raised by a predetermined appeal operation (a coordination operation) according as the lure 51 passes on the mark 53B. The appeal operation is performed, imaging that the vertical action of the lure 51 is performed by the upward movement of the fishing rod, and it is preferable to set the upward operation by the direction indicating switch 5 as the appeal operation. The appeal degree is decreased if the lure 51 gets out of the mark 53A, or the appeal operation is not appropriately performed.

On the other hand, when the lure window 50B of FIG. 8 is displayed, the lure 51 performs a vertical movement on the window 50 according to the course change operation with the input device 4 by the player. The course change operation is performed, imaging that the depth of the lure is changed by changing the retrieving speed of the lure (pulling speed) in actual fishing, and, for example, it is preferable to deal the lure 51 as pulled by the operation of the direction indicating switch 5 in a left direction. That is, in the case of the lure 51 which sinks by pulling, and floats by loosing, the lure 51 is moved downward, assuming that the lure 51 is pulled, when the direction indicating switch 5 is operated in a left direction, and the lure 51 is gradually raised at a fixed rate when such operation is not performed. On the contrary, in the case of the lure 51 which floats by pulling, and sinks by loosing, the lure 51 is moved upward, when the direction indicating switch 5 is operated in a left direction, and the lure 51 is gradually moved downward at a fixed rate when such operation is not performed.

Figure 9:
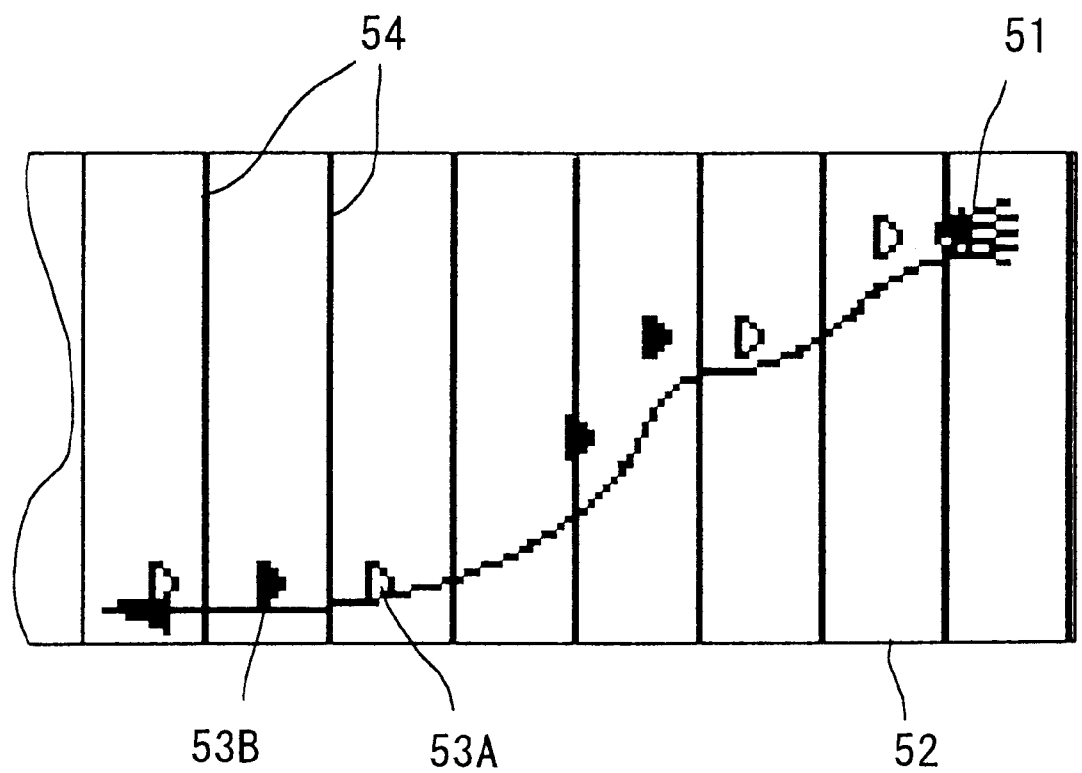
FIG. 9 is a view showing how a lure is operated according to a command given through the lure windows of FIG. 8.

In the lure window 50B of FIG. 8, the background 52 is moved in a scrolling display mode at a predetermined speed from the left side to the right one of the window 50A with marks 53A and 53B, and the partition lines 54. That is, in the case of the lure window 50B, the background 52 is configured as an image of a crosswise strip shape as shown in FIG. 9, and a part of the background 52 is displayed in the lure window 50B. The display range is gradually moved in a left direction, and the background 52 in the window 50B is scrolled. The background 52 is scrolled to show how the lure 51 is retrieved toward the character 31, changing the water depth according to the course change operation with the input device 4.

The marks 53A and 53B show a passing position of the lure 51 during an appropriate action of the lure 51, in a similar manner to that of the embodiment in FIG. 6. And the marks 53A and 53B are distinguished each other by color. If the player can make the lure 51 pass on the mark 53A by changing the water depth of the lure 51, the appeal degree (a value of the appeal meter 37) is raised. And, the appeal degree is raised by a predetermined appeal operation (for example, an upward operation with the direction indicating switch 5) according as the lure 51 passes on the mark 53B. The appeal degree is decreased if the lure 51 gets out of the mark 53A, or the appeal operation is not appropriately performed.

As mentioned above, when the player operates the lure 51 with the input device 4 to move the lure 51 following the marks 53A and 53B, the appeal degree is gradually increased to the maximum value, as shown in FIGS. 7 and 9, respectively, according to the lure window 50A and 50B, and then it may start to catch more fish. As mentioned above, as the guidance for the operation of the lure 51 is given to the player, and the value of the appeal meter 37 is configured to be changed according to whether or not the operation of the player is appropriately responded to the guidance, the player may always monitor whether or not his or her lure is appropriately operated to have a positive response to the lure operation. But, a trajectories of the lure in FIGS. 7 and 9, are not displayed in the actual lure windows 50A and 50B.

The arrangement of the marks 53A and 53B in the background 52 may be previously made as data and stored in the ROM 18 of the external storage device 17. The arrangement of those marks may be produced as data by each lure 51, or the type of the lure 51, or may be decided using random numbers. As degree of difficulty in operation of the lure 51 may be changed by making use of the arrangement of those marks 53A and 53B, a plurality of data with different degrees of difficulty, may be previously prepared in the ROM 18, and data with high degree of difficulty may be selected for display in the lure window 50, as the game progresses. A lure may be given to the player as a reward for wins in the games, and the performance of the lure maybe advanced, while the degree of the difficulty in the required operation may be raised at the same time.

Figure 10:
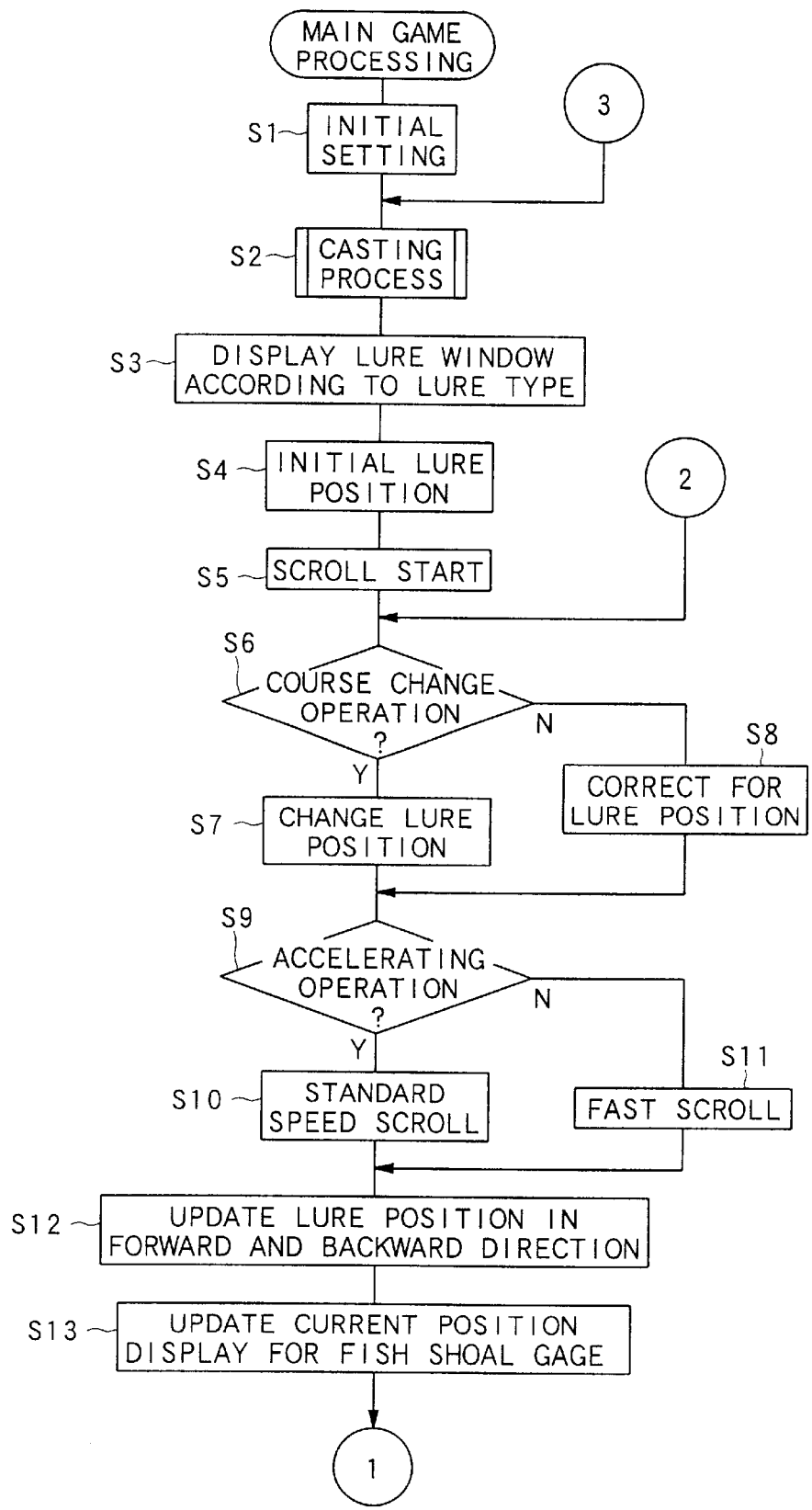
FIG. 10 is a flowchart denoting a procedure for a main game processing executed by a CPU of a control device of FIG. 2.
Figure 11:
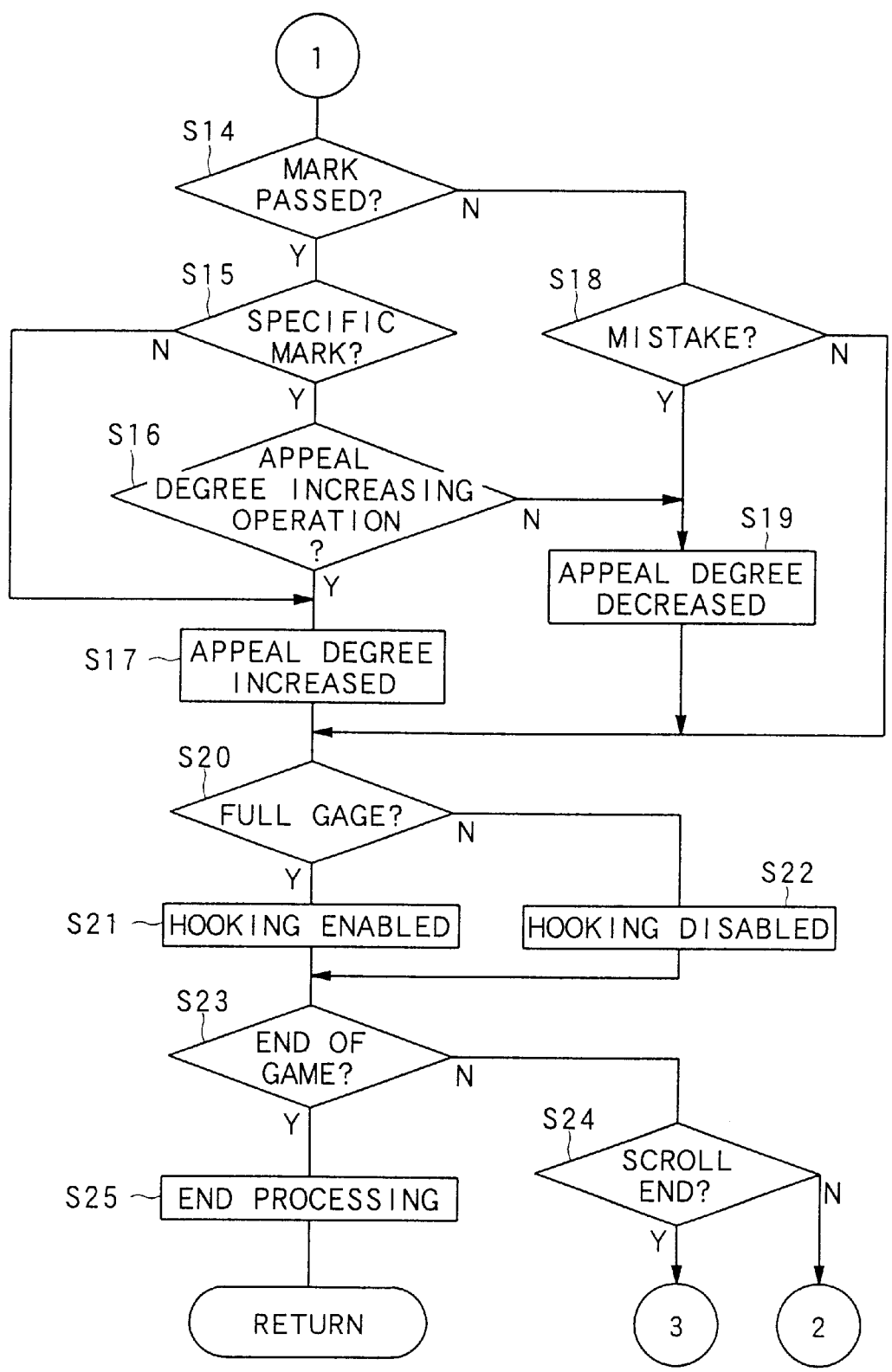
FIG. 11 is a flowchart continued from FIG. 10.

Then, various kinds of processing for a fishing game will be described, which the CPU 11 executes according to programs stored in the external storage device 17 referring to FIGS. 10 to 13. FIGS. 10 and 11 show a flowchart denoting a procedure for a main gaming processing executed at playing the fishing game.

In the main game processing, an initial conditions are set for playing the fishing game (step S1), and subsequently, casting processing is performed (step S2). The casting processing, in which a casting position of a lure is decided referring to signals from the input device 4, will be described later. On completion of the casting processing, the lure window 50A of FIG. 6, or the lure window 50B of FIG. 8 is displayed according to the lure type (step S3). Data (position data) to specify the position of the lure 51 in the background 52 are set to an initial value, and the lure 51 is displayed at an initial position in the window 50 (step S4).

Then, scroll of the background 52 is started (step S5). Subsequently, it is judged whether or not the course change operation of the lure has been done (step S6). The course change operation is mentioned above. The position data of the lure 51 is changed according to the contents of the operation, when a course change operation is performed. Following the above, the display position of the lure 51 is changed in a crosswise direction of the window 50 (in a crosswise direction in FIG. 6 and in a vertical direction, in FIG. 8). At step S6, the position data in the vertical direction is corrected by a predetermined amount (step S8) according to the type of the lure, when it is judged that there is no course change operation. The correction is performed for expressing that the lure 51 floats and sinks when the lure window 50B of FIG. 8 is used. The amount of correction for one time is previously set, for example, every lure 51, and stored in the ROM 18. The correction may not be performed when the lure window 50A of FIG. 6 is used.

After processing at step S7, or S8, it is judged whether or not a predetermined amount of speed-up operation for the input device 4 has been performed (step S9). In the case of no speed-up operation, the background 52 is scrolled at a standard speed (step S10), and in the case of the operation, the background 52 is made to be scrolled at a high speed (step S11). Then, data showing the position of the lure in a back and forth direction in the main screen 30 and the background 52 is updated, according to the scrolling amount (step S12). In addition, the position of the cursor 33a in the gauge of a shoal of fish 33 is renewed, according to the current position of the lure (step S13). After that, the processing is advanced to step S14 of FIG. 11.

At step S14, it is judged whether or not the lure 51 has passed on the mark 53A or 53B. In the present case, ranges with a predetermined width are set in a crosswise direction of the window 50 around the marks 53A and 53B, respectively. And when the lure 51 passes the range, it is concluded that the lure 51 has passed on the mark 53A or 53B. When there is an affirmative decision at step S14, it is judged whether or not it has passed on the mark 53B requiring appeal operation (step S15). In the affirmative response to the decision, it is subsequently decided whether or not the appeal operation has been synchronously done with the passing of the lure 51 on the mark 53B (step S16). In the above case, before and after the lure 51 passes the mark 53B, a fixed allowable range of may be set, and it is decided that the appeal operation has been synchronously performed with the passing on the mark 53B, if there is an appeal operation within the allowable range.

When it is judged that there has been an appeal operation at step S16, or, when it is decided that the lure does not pass on the mark 53B (meaning that it passes on the mark 53A) at step S15, the appeal degree stored in the RAM 13 is increased by a predetermined amount, and the display of the appeal meter 37 is updated according to the above updating (step S17). Then, the processing is advanced to step S20. In the case of the negative decision at step S14, it is judged whether or not the course of the lure 51 is incorrect, that is, deviates from the mark 53A or 53B (step S18). When it is decided that it is incorrect, the appeal degree stored in the RAM 13 is decreased by a predetermined amount, and the display of the appeal meter 37 is updated according to the above updating (step S19). Then, the processing is advanced to step S20. The similar processing is taken when it is decided that there has been no appeal operation at step S16. When it is decided that there has been no passing at step S18 (when there is neither the mark 53A nor 53B at both sides of the lure 51 at step), step S19 is skipped and the processing is advanced to step 520.

At step S20, it is judged whether or not the appeal degree stored in the RAM 13 is the maximum, that is, whether or not the pointer of the appeal meter 37 has reached the right end. If it is the maximum, data which are stored in the RAM 13 for judgment whether or not hooking (fish is caught with the lure) is permitted, are set to a value corresponding to hooking permission (step S21). If it is not the maximum, the above data are set to the value corresponding to hooking rejection (step S22).

Then, it is judged whether or not predetermined conditions for finishing the game have been fulfilled (step S23). In the negative case, it is subsequently judged whether or not scrolling has been finished, that is, whether or not the lure has been retrieved to a predetermined position of the main screen 30 (a position corresponding to the bottom of the gauge of a shoal of fish 33) (step S24). In the negative case, the processing is returned to step S6, and in the affirmative one, returned to step S2. When it is decided that the game has been over at step S23, the predetermined termination processing is performed (step S25), and the completion of the termination processing device that the processing for the main game has been completed. Various kinds of conditions such as whether a time limit has been over, whether number of caught fish has exceeded a fixed value, and whether mass of caught fish has passed a fixed value, may be used for the predetermined conditions for finishing the game.

Figure 12:
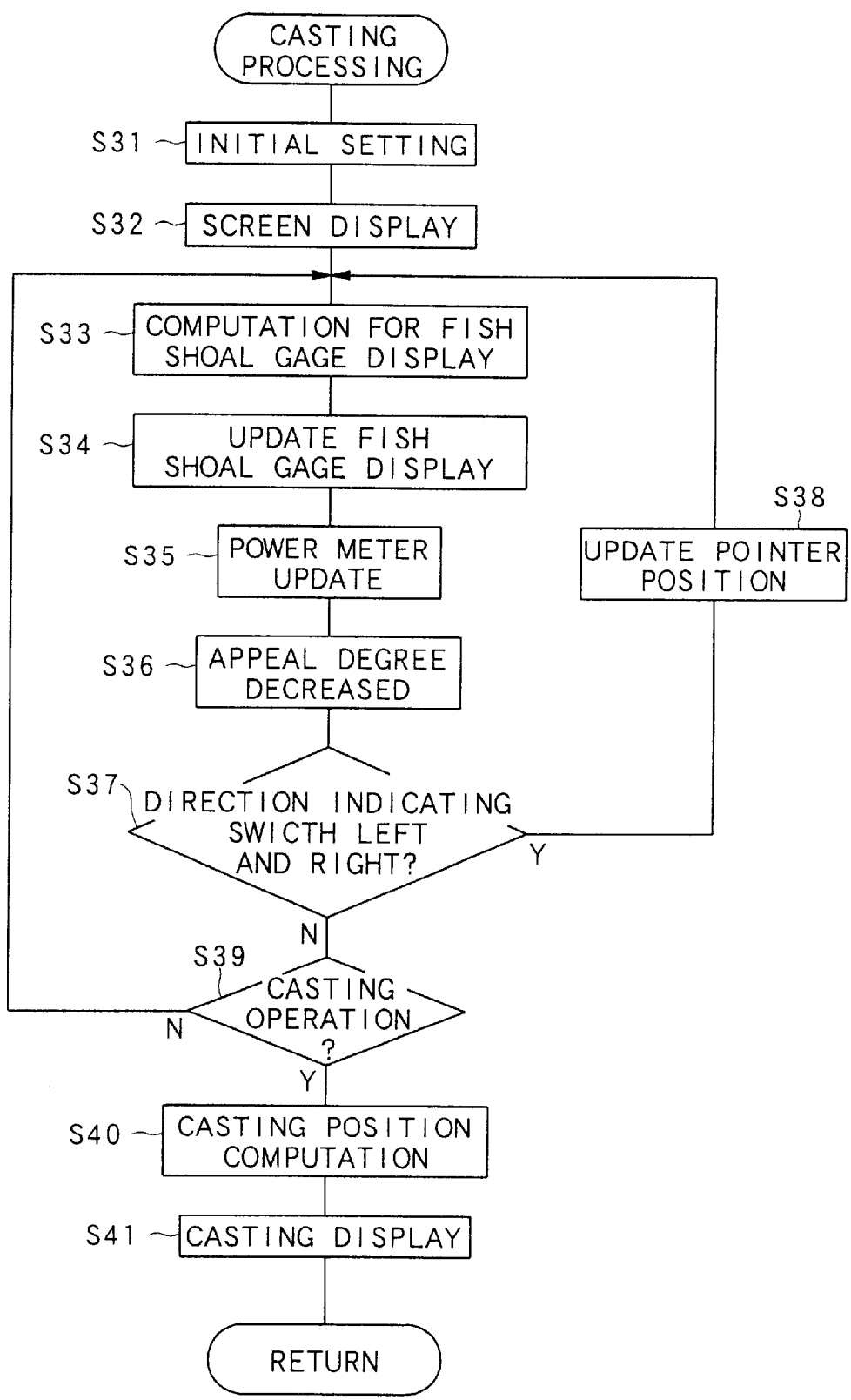
FIG. 12 is a flowchart showing a procedure for a casting processing executed as a subroutine processing of FIG. 10.

FIG. 12 is a flowchart showing details of a casting processing executed at step S2 of FIG. 10.

In the casting processing, the initialization of parameters and so on for casting of a lure is firstly performed (step S31). Subsequently, images for the casting are displayed on the main screen 30 (step S32). Moreover, calculation for display of the gauge of a shoal of fish 33 is performed (step S33). The display of the gauge 33 is updated based on the above calculation results (step S34). Calculation and display appearance to display the gauge 33 are as described above, referring to FIG. 4.

Then, a value of the power meter 36 stored in the RAM 13 is increased by a predetermined amount, and the display of the power meter 36 is updated according to the above change (step S35). If the value of the power meter 36 is the maximum value at this time, it is reset to the minimum.

Subsequently, the appeal degree stored in the RAM 13 is decreased by a predetermined amount. Accordingly, the display of the appeal meter 37 is updated (step S36). Moreover, it is judged whether or not the direction command switch 5 has been operated in a crosswise direction (step S37). In the affirmative decision, the position of the pointer 34 is changed by a predetermined amount in a direction where the direction indicating switch 5 has been operated at step S38, and the processing is returned to step S33.

Therefore, after start of the casting processing, processing from step S33 to step S38 is repeatedly executed, during operation of the direction indicating switch 5 in a crosswise direction by the player, and the pointer 34 of the main screen 30 is moved in a crosswise direction. Then, the fish distribution from the position of the character 31 to the pointer 34 is calculated, and the display of the gauge of a shoal of fish 33 is updated as shown in FIG. 5, according to the above. Thereby, the player may decide the best direction for casting by confirmation of the fish distribution. However, the player is required to decide the direction of casting as early as possible, as the value of the appeal meter 37 is gradually decreased during moving of the pointer 34.

When it is decided that the direction command switch 5 has not been operated in a crosswise direction in step S37, it is judged whether a predetermined casting operation (for example, a pushing operation of the push button switch 6) has been performed for the input device 4 (step S39). When not decided, the processing is returned to step S33. When it is decided that the casting operation has been performed, the casting position is calculated based on the value of the power meter 36 and the position of the pointer 34 at that time (step S40). The casting position is on the line connecting the pointer 34 and the character 31, and the distance from the character 31 is proportional to the value of the power meter 36 at a point when the casting operation has been performed. Subsequently, it is displayed how the lure is cast to the calculated casting position (step S41). The above is all the casting processing.

Figure 13:
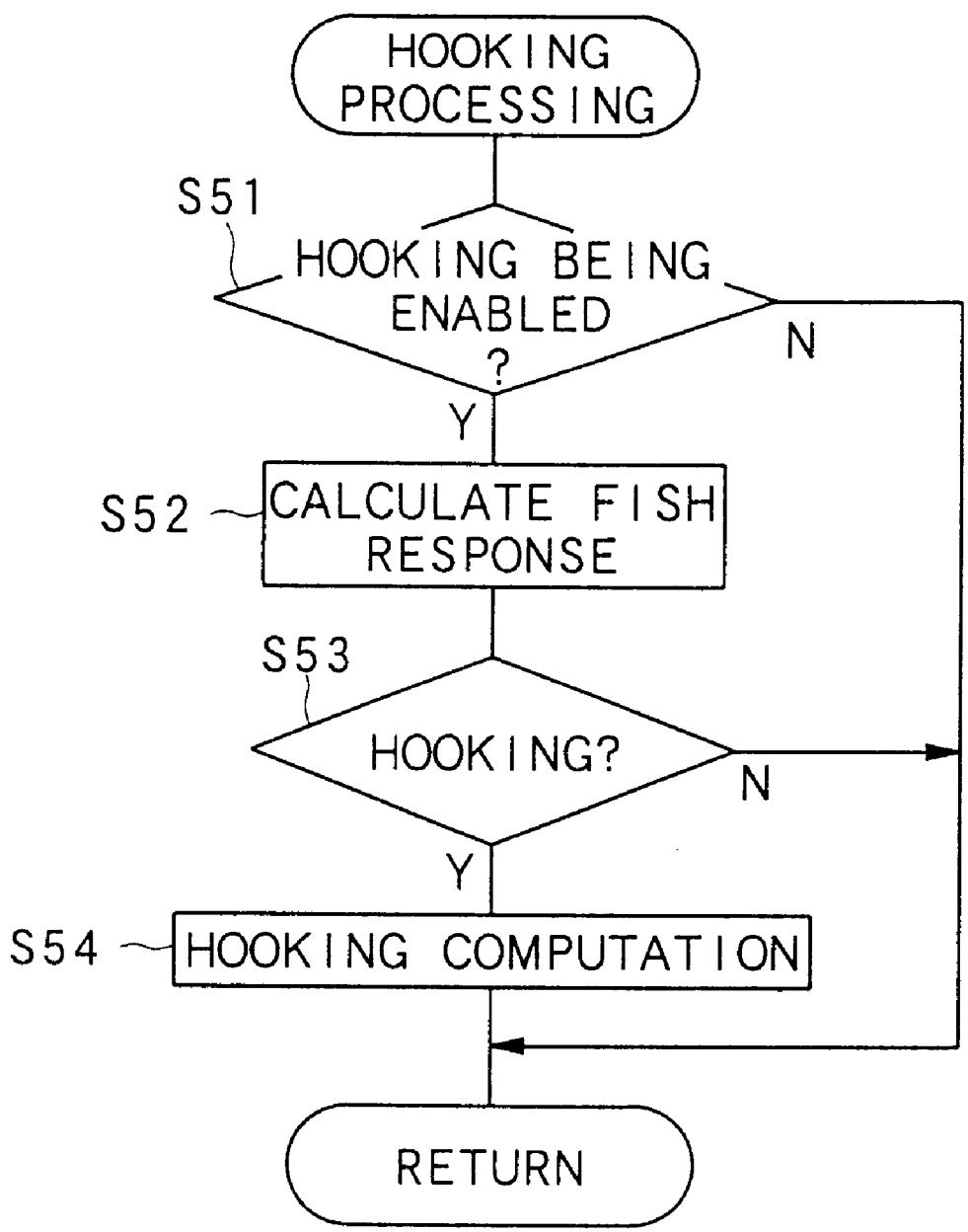
FIG. 13 is a flowchart showing a procedure for a hooking processing executed by the CPU of the control device of FIG. 2.

FIG. 13 is a flowchart showing the procedure of the hooking processing simultaneously executed at a fixed cycle in the CPU 11, with the processing in FIGS. 10 and 11. In the hooking processing, it is judged whether data which are stored in the RAM 13 for judgment whether or not hooking (fish is caught with the lure) is permitted, are set to a value corresponding to hooking permission (step S51). The above data are set in step S21 or S22 in FIG. 11.

In the case of the hooking rejection, the hooking processing is completed. That is, it is assumed that no fish is caught when the appeal meter 37 has not reached the maximum value. In the case of the hooking permission, the reaction of the fish to the lure is calculated (step S52). For example, the reaction degree to the lure is calculated according to predetermined operational formula, considering the distance to the lure, the affinity for the lure types and so on, with regards to each fish within the detection range 41 shown in FIG. 4. In the above case, since the range 41 is extensively set when the lure with a high appeal degree is used, the range to be calculated at step S52 is extended, and then the probability to catch fish may be increased.

However, it is not required that the detection range 41 to display the gauge of a shoal of fish 33 accords to the range for calculation of reaction of the fish. If the gauge of a shoal of fish 33 is considered just as one of standards, the fish even outside of the detection range 41 may be configured to be hooked with the lure, by calculating the reaction of the fish being within wider range than the detection range 41. On the contrary, it may be possible to have a configuration that the fish even within the detection range 41 has no reaction to the lures, by calculating the reaction of lure only for fish within smaller range than the detection range 41.

In the subsequent step S53, it is judged, based on the calculation results of the fish reaction, whether or not there is any hooking, that is, whether any of fish is caught with the lure. When it is decided that there is the hooking, processing to show the scene for the hooking to the player is performed (step S54). For example, the animation window 32 in FIG. 3 is displayed on the main screen 30 to show how the fish is caught with the lure. When the game device 1 is provided with excitation device, the device may be used for showing the hooking to the player by vibration.

After production of the hooking scene at step S54, or when it is decided that there is no hooking at step S53, the hooking processing is completed.

Figure 14:
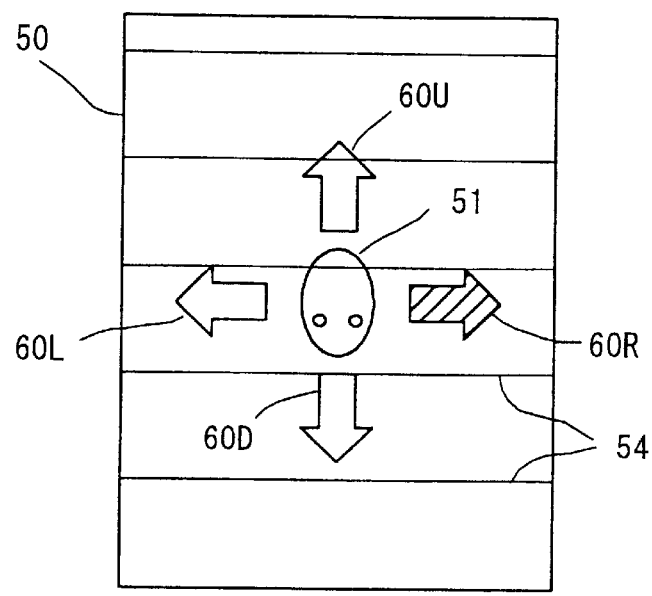
FIG. 14 is a view showing another example of the lure windows.

In the embodiment mentioned above, the mark 53A shows only information of the direction for the lure operation, and the mark 53B shows information of the direction and timing for the lure operation. However, only one of them may be used. As shown in FIG. 14, arrow-shaped direction command marks 60U, 60D, 60R, and 60L (occasionally, shown as the reference numeral 60) may be arranged on the up, down, right, and left sides of the lure 51, respectively, and the player may be required to operate the direction command switch 5 in the same direction as that of the lighted mark 60 (in FIG. 14, the mark 60R is lighted).

Figure 15:
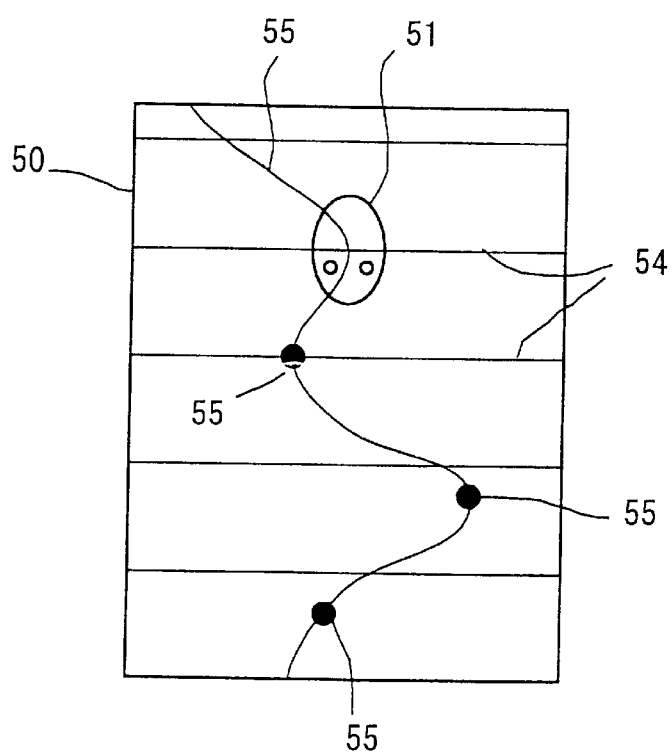
FIG. 15 is view showing further another example of the lure window.

And a preferable trajectory line 55 of the lure 51 may be displayed in the background 52 as shown in FIG. 15, and the player may be required to operate the lure 51 for following the trajectory. Moreover, an appeal point 55a may be properly set on the trajectory line 55, and, when the lure 51 passes on the point, the player may be required to perform the appeal operation in a similar manner to that of the case where the lure passes on the mark 53B.

Figure 16:
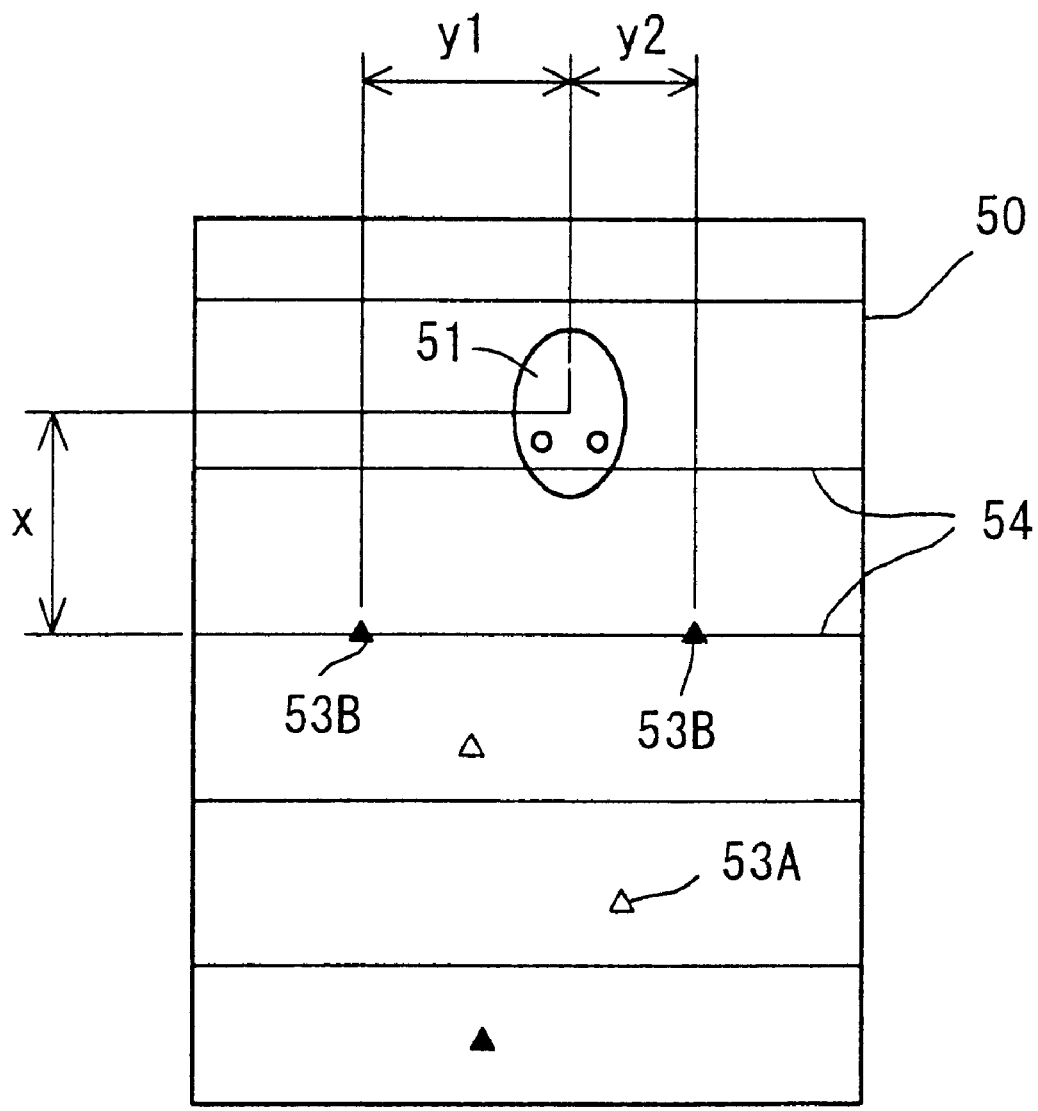
FIG. 16 is a view showing still another example of the lure window.

As shown in FIG. 16, a plurality of marks 53B (or 53A is acceptable) may be arranged in a crosswise direction of the lure window 50, and the difference in increased amount of the appeal degree may be provided based on a distance y (y1 and y2) from the lure 51 to the mark 53B at the point when the lure 51 is remote from-those marks 53B by a predetermined amount x in a moving direction. In the above case, as the larger distance y causes the more difficult operation for passing on the mark, it is reasonable to set larger increasing amount of the appeal degree for the case at passing on the mark 53B with a larger distance y than that for the case at passing on the mark 53B with a smaller distance y.

In the processing in FIGS. 10 and 11, the scrolling speed of the background 52 is changed (steps S9 to S11) according to the presence of the speed-up operation for the input device 4. Such speed-up operation may be eliminated, and the scrolling speed of the background 52 (equal to the retrieving speed of the lure 51) may be fixed to a fixed value. For example, the background 52 may be scrolled at a fixed speed, and the lure 51 may only be moved in a crosswise direction of the lure window 50 according to the course change operation. A decreasing operation of the scrolling speed to a slower speed than a standard one may be provided. In stead of the change of the scrolling speed or in addition to the above change, the lure 51 may be moved in a back and forth direction of the lure window 50 (a vertical direction of FIG. 6 and a crosswise direction in FIG. 8), according to the change operation of the retrieving speed for the input device 4.

The increased amount of the appeal degree when the lure 51 passes on the mark 53A may be a fixed amount, or may be changed according to the conditions. For example, when a number of lures 51, more than a fixed value, pass on the mark 53A, the increased amount of the appeal degree may be made larger than that of the usual case. The operation for the mark 53B is performed in a similar manner to that of the mark 53A. Pieces of suitable music may be reproduced as a BGM (background music) during guidance of the operation of the lure 51, and the lure 51 may be operated according to a rhythm, using the lure window 50. In addition, when the lure 51 passes on the mark 53A, or when the appeal operation is appropriately performed according to passing on the mark 53B, a sound effect may be generated, or some kinds of productions may be added to the image.

In the above fishing game, the hooking is permitted, and advantageous situations for the player are generated, when the appeal degree reaches the maximum value. However, if the appeal degree reaches within a fixed range from the maximum value, the hooking may be permitted, or, the higher appeal degree may be configured to causes the higher probability for catching fish. In addition, a specially big fish may be configured to be caught, only when the appeal degree reaches the maximum value, or a special technique for the character 31 to catch a fish may be provided. In short, the exactness of the player to the guidance of the lure operation may be evaluated in a form of the appeal degree or the obtained scores to change the game results according to the evaluation results.

As described above, according to the game system of the present invention as the fish distribution is detected on the gauge with each position within the detection range and each position on the gauge in correspondence with each other, the player may easily understand where and how many fishes are arranged. Therefore, in comparison with a conventional case to display only a group of fish, more pieces of information on the fish arrangement may be given to the player.

And, according to a storage medium of the present invention, the control device for the game system of the present invention may be realized by making a computer read and execute the programs stored in the above medium.

What is claimed is:

1. A game system comprising:
    an image display device;
    an input device for output of signals according to a player's operation; and
    a control device to proceed with a fishing game in a virtual fishing spot, referring to outputs of said input device, and to display images on a screen of said display device according to a progressing state of said fishing game; wherein said control device comprises:
    arrangement decision device to decide a fish arrangement in said virtual fishing spot;
    detection device to detect a fish distribution in a detection range defined on a line connecting two positions in said fishing spot; and
    distribution display device to display a gauge extending in a direction of one axis on the screen of said display device, and to display information according to a detected result of said distribution at each position on said detection range, at each position on said gauge, replacing a distance from one end of said detection range to each position within said detection range with a distance from one end of said gauge to each position in said gauge.

2. A game system according to claim 1, wherein detection range display device to display information for specifing said detection range on the image according to said fishing spot displayed on said display device is provided.

3. A game system according to claim 1 or 2, comprising position change device to change at least one of two positions defining said detection range, according to a predetermined position change operation for said input device, wherein
    said detection device performs re-detection of said fish distribution after redefinition of said detection range in cooperation with on the position change by said position change device; and
    said distribution display device updates the display on said gauge, corresponding to the re-detection of said distribution.

4. A game system according to any one of claim 1 or 2, wherein there is provided width change device to change the width of said detection range.

5. A game system according to any one of claim 1 or 2, wherein said distribution display device displays information according to a detected result of said distribution by changing a display appearance at each position on said gauge, depending on the presence or absence of a fish at each position within said detection range.

6. A game system according to claim 1, wherein said detection range is set at least on a part of a range on a line connecting a start and a planned casting position of a contrivance in said fishing spot.

7. A game system according to claim 6, wherein there is provided position display device to display images to respectively specify said casting start and said planned casting position, on images according to said fishing spot displayed on said display device.

8. A game system according to claim 6 or 7, comprising a position change device to change at least one of a start and a planned casting position according to a predetermined position change operation with said input device, wherein
    said detection device performs re-detection of said fish distribution after redefinition of said detection range depending on the position change by said position change device; and
    said distribution display device updates the display on said gauge, corresponding to the re-detection of said distribution.

9. A game system according to any one of claim 6 or 7, wherein said system comprises detection range change device to change the width of said detection range according to the kind of said contrivance.

10. A game system according to any one of claim 6 or 7, wherein said system comprises contrivance position display device to display an image denoting a current position of said contrivance on said gauge or its vicinity.

11. A game system according to any one of claim 6 to 10, wherein said system comprises casting execution device to cast said contrivance at any one of positions on the line connecting said start and planned casting position of said contrivance corresponding to a predetermined casting operation with said input device.

12. A game system according to any one of claim 1, 2, 6 or 7, wherein said arrangement decision device decides said fish arrangement, considering a fish behavior that the smaller fish has the more remarkable tendency to form a group, and the bigger one has the more remarkable tendency to have solitary behavior.

13. A computer-readable storage medium storing a program to progress a fishing game in a virtual fishing spot, referring to outputs of an input device of a game device, and to display images, according to a progressing state of said game, on a screen of a display device of said game device, wherein said program makes a computer installed in said game device function as:

arrangement decision device to decide a fish arrangement in said virtual fishing spot;

detection device to detect a fish distribution in a detection range defined on a line connecting two positions in said fishing spot; and gauge display control device to display a gauge extending in a direction of one axis on a screen of said display device, and to display information according to a detected result of said distribution at each position on said detection range, at each position of the above gauge, replacing a distance from one end of said detection range to each position within said detection range with a distance from one end of said gauge to each position in said gauge.

* * * * *